US007896425B2

(12) United States Patent
Elliott et al.

(10) Patent No.: US 7,896,425 B2
(45) Date of Patent: *Mar. 1, 2011

(54) SIMULTANEOUS MOVEMENT SYSTEM FOR A VEHICLE DOOR II

(75) Inventors: Adrian Elliott, Dearborn, MI (US); Jason Falenski, Berkley, MI (US); David Lechkun, Shelby Township, MI (US); Craig Blust, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/503,628

(22) Filed: Jul. 15, 2009

(65) Prior Publication Data

US 2011/0010998 A1 Jan. 20, 2011

(51) Int. Cl.
*B60J 5/00* (2006.01)

(52) U.S. Cl. .................... 296/146.12; 296/155; 49/210; 49/211; 49/213; 49/216; 49/219; 49/223; 16/359; 16/360

(58) Field of Classification Search .............. 296/146.1, 296/155, 146.9, 146.11, 146.12; 16/357–360; 49/209, 210, 211, 213, 216, 218, 219, 221, 49/223, 360
See application file for complete search history.

(56) References Cited

U.S. PATENT DOCUMENTS

| | | | | |
|---|---|---|---|---|
| 3,051,999 | A | 9/1962 | Schimek | |
| 3,075,803 | A * | 1/1963 | Wilfert | 49/212 |
| 3,313,063 | A | 4/1967 | Patin | |
| 3,619,853 | A | 11/1971 | Merrill | |
| 3,628,216 | A | 12/1971 | Savell | |
| 3,935,674 | A | 2/1976 | Williams et al. | |
| 4,025,104 | A | 5/1977 | Grossbach et al. | |
| 4,135,760 | A | 1/1979 | Grossbach | |
| 4,945,677 | A | 8/1990 | Kramer | |
| 5,139,307 | A | 8/1992 | Koops et al. | |
| 5,251,953 | A | 10/1993 | Willey | |
| 5,398,988 | A | 3/1995 | DeRees et al. | |
| 5,507,119 | A | 4/1996 | Sumiya et al. | |

(Continued)

FOREIGN PATENT DOCUMENTS

EP 0012511 A1 6/1980

(Continued)

*Primary Examiner*—Dennis H Pedder
(74) *Attorney, Agent, or Firm*—Gregory P. Brown; Price, Heneveld, Cooper, DeWitt & Litton, LLP

(57) ABSTRACT

A simultaneous movement system for a vehicle door is provided. The system includes a simultaneous movement system comprising first and second primary hinge arms, first and second secondary hinge arms, primary and secondary rails and guide track. The second primary hinge arm and the second secondary hinge arm are pivotally mounted to a vehicle body structure on one end and are pivotally mounted to a primary slide and a secondary slide at the other ends respectively. The first primary hinge arm includes a guide track region and a rail region. The primary rail receives a primary slide. The secondary rail receives a secondary slide. The guide track receive the guide track region of the primary hinge arm thereby allowing the primary hinge arm to travel along both the guide track and the primary rail simultaneously through the guide track region and the rail region of the primary hinge arm.

24 Claims, 9 Drawing Sheets

U.S. PATENT DOCUMENTS

| | | | | |
|---|---|---|---|---|
| 5,561,887 | A | 10/1996 | Neag et al. | |
| 5,812,684 | A | 9/1998 | Mark | |
| 5,846,463 | A | 12/1998 | Keeney et al. | |
| 5,896,704 | A | 4/1999 | Neag et al. | |
| 5,921,613 | A | 7/1999 | Breunig et al. | |
| 6,030,025 | A | 2/2000 | Kanerva | |
| 6,036,257 | A | 3/2000 | Manuel | |
| 6,183,039 | B1 | 2/2001 | Kohut et al. | |
| 6,196,618 | B1 | 3/2001 | Pietryga et al. | |
| 6,213,535 | B1 | 4/2001 | Landmesser et al. | |
| 6,299,235 | B1 | 10/2001 | Davis et al. | |
| 6,382,705 | B1 | 5/2002 | Lang et al. | |
| 6,394,529 | B2 | 5/2002 | Davis et al. | |
| 6,447,054 | B1 | 9/2002 | Pietryga et al. | |
| 6,572,176 | B2 | 6/2003 | Davis et al. | |
| 6,629,337 | B2 | 10/2003 | Nania | |
| 6,793,268 | B1 | 9/2004 | Faubert et al. | |
| 6,802,154 | B1 | 10/2004 | Holt et al. | |
| 6,817,651 | B2 | 11/2004 | Carvalho et al. | |
| 6,826,869 | B2 | 12/2004 | Oberheide | |
| 6,860,543 | B2 | 3/2005 | George et al. | |
| 6,896,315 | B2 | 5/2005 | Batanli et al. | |
| 6,926,342 | B2 | 8/2005 | Pommeret et al. | |
| 6,942,277 | B2 | 9/2005 | Rangnekar et al. | |
| 6,997,504 | B1 | 2/2006 | Lang et al. | |
| 7,000,977 | B2 | 2/2006 | Anders | |
| 7,032,953 | B2 | 4/2006 | Rangnekar et al. | |
| 7,104,588 | B2 | 9/2006 | George et al. | |
| 7,168,753 | B1 | 1/2007 | Faubert et al. | |
| 7,178,853 | B2 | 2/2007 | Oxley et al. | |
| 7,219,948 | B2 | 5/2007 | Curtis, Jr. et al. | |
| 7,243,978 | B2 | 7/2007 | Mather et al. | |
| 7,393,044 | B2 | 7/2008 | Enomoto | |
| 7,438,346 | B1 * | 10/2008 | Breed | 296/146.4 |
| 7,469,944 | B2 | 12/2008 | Kitayama et al. | |
| 7,552,953 | B2 | 6/2009 | Schmoll et al. | |
| 7,611,190 | B1 | 11/2009 | Elliott et al. | |
| 7,640,627 | B2 | 1/2010 | Lowen et al. | |
| 7,658,438 | B1 * | 2/2010 | Elliott et al. | 296/155 |
| 7,765,740 | B2 * | 8/2010 | Heuel et al. | 49/360 |
| 2002/0096800 | A1 | 7/2002 | Keeney et al. | |
| 2003/0218358 | A1 | 11/2003 | Hahn | |
| 2005/0093337 | A1 | 5/2005 | Herrmann et al. | |
| 2005/0116496 | A1 | 6/2005 | Lowson et al. | |
| 2005/0146159 | A1 | 7/2005 | Shen et al. | |
| 2006/0059799 | A1 | 3/2006 | Zimmer et al. | |
| 2006/0103047 | A1 | 5/2006 | Zwolinski | |
| 2006/0267375 | A1 * | 11/2006 | Enomoto | 296/155 |
| 2007/0075565 | A1 | 4/2007 | Magsaam | |
| 2007/0085374 | A1 | 4/2007 | Mather et al. | |
| 2007/0214606 | A1 | 9/2007 | Hoffman | |
| 2008/0224501 | A1 | 9/2008 | Zimmer et al. | |
| 2009/0051194 | A1 | 2/2009 | Elliott et al. | |
| 2009/0070960 | A1 | 3/2009 | Elliott et al. | |
| 2009/0072582 | A1 | 3/2009 | Elliott et al. | |
| 2009/0072583 | A1 | 3/2009 | Elliott et al. | |
| 2010/0095595 | A1 * | 4/2010 | Hanaki et al. | 49/359 |
| 2010/0154313 | A1 * | 6/2010 | Elliott et al. | 49/360 |

FOREIGN PATENT DOCUMENTS

| | | | |
|---|---|---|---|
| EP | 0875434 | A1 | 11/1998 |
| EP | 0957019 | A2 | 11/1999 |
| GB | 389061 | A | 5/1931 |
| WO | WO2006/005572 | | 1/2006 |

* cited by examiner

SIMULTANEOUS MOVEMENT SYSTEM FOR A VEHICLE DOOR II

BACKGROUND

The present disclosure relates generally to hinge and slide devices, and more particularly, to such a packaging efficient device for vehicle doors.

Sliding door structures are generally implemented on vehicles to reduce the door swing distance from the vehicle body; to allow for better ingress and egress into or from a vehicle; and to improve the package (or layout) of a vehicle. This type of design is particularly helpful when a user is parking a vehicle in a confined area where there is little available room for door swing.

In the sliding door structure, guide rails are generally included at the roof rail/cant rail and rocker sill, as well as adjacent to a vehicle body class A surface (the exterior sheet metal of the vehicle). The guide rail on the class A surface is generally configured as a linear track just below the side window. In addition, such vehicles generally also implement a curved guide track on the vehicle body at the sill and/or side rail/cant rail to guide the sliding door into the closed position against the vehicle body. To open the sliding door, the sliding door is projected in a vehicle exterior direction along a curved guide rail, and then the sliding door is moved along a separate linear guide rail to a fully opened position. To close the traditional sliding door, the sliding door is moved from the linear guide rail to the curved guide rail such that the as the door travels along the curved guide rail, the door is pulled inward against the vehicle to a closed position.

However, a traditional sliding door movement does coincide with the curved shape of the guide rail once it transitions from the linear track to the curved track resulting in a two step operation for opening and closing the sliding door, thereby resulting in disrupted motion as the vehicle door is opened and closed

SUMMARY

A simultaneous movement system for a vehicle door is provided according to embodiments disclosed herein. The system includes first and second primary hinge arms, first and second secondary hinge arms, in addition to primary and secondary rails. The second primary hinge arm and the second secondary hinge arm are pivotally mounted to a vehicle body structure on one end and are pivotally mounted to a primary slide and a secondary slide at the other ends respectively. The first primary hinge arm includes a guide track region and a rail region. The guide track receives the guide track region of the primary hinge arm thereby allowing the primary hinge arm to travel along both the guide track and the primary rail simultaneously through the guide track region and the rail region of the primary hinge arm.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure provides a simultaneous movement system 10 for a sliding and articulating vehicle door 12 wherein the class A surface of the vehicle is not disrupted with a door track for the sliding door system. The present disclosure allows for stable, yet simultaneous sliding and articulating of a vehicle door 12 and also provides a door system 10 that requires minimal package space on the vehicle body.

The simultaneous movement system 10 of the present disclosure is particularly beneficial with vehicles where there is minimal space to mount a sliding door system, such as a pick-up truck where in the vehicle cab terminates proximate to the pick-up truck box, or a sedan vehicle structure. In one non-limiting example, a pick up truck and a sedan structure are in contrast to a van structure in that a pick-up truck or sedan B or C pillar provide a much smaller mounting surface for a sliding door system than a van structure due to the fundamental differences in vehicle architecture. Accordingly, the simultaneous movement system 10 disclosed herein substantially and advantageously overcomes at least the potential drawbacks noted in the background above.

Referring now to the non-limiting examples shown in FIGS. 1-10 together, a simultaneous movement system 10 for a vehicle door 12 may generally be mounted onto a vehicle. As described in greater detail below, in order to facilitate ingress and egress into and from a vehicle (not shown), the simultaneous movement system 10 for a vehicle door 12 may allow for smooth and continuous opening/closing of a door 12 independent of another adjacent structure or door (not shown) being open or closed. It is to be understood that mass production vehicles having independently opening doors are not readily available at this time due to proper closure and sealing issues as the doors mate together.

Figure 1:
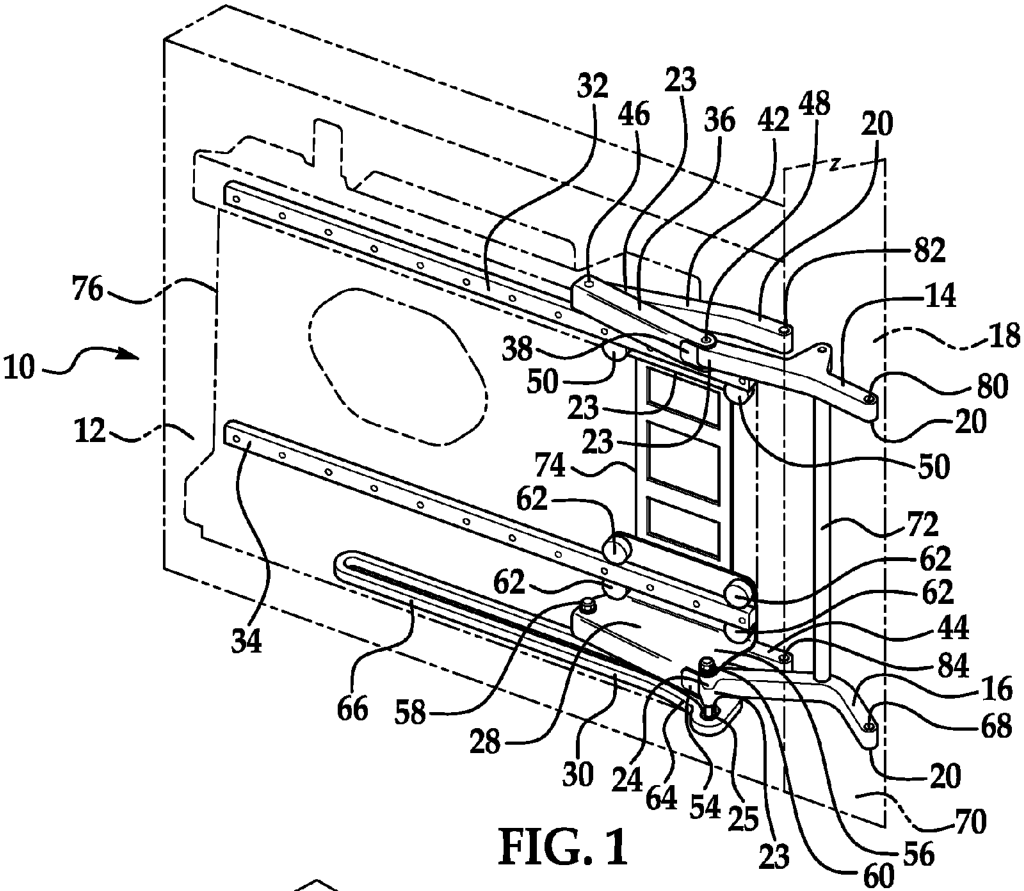
FIG. 1 is an isometric view of a first embodiment of a simultaneous articulating and sliding door system (vehicle door and vehicle body shown in phantom) when the door is in the closed position.
Figure 2:
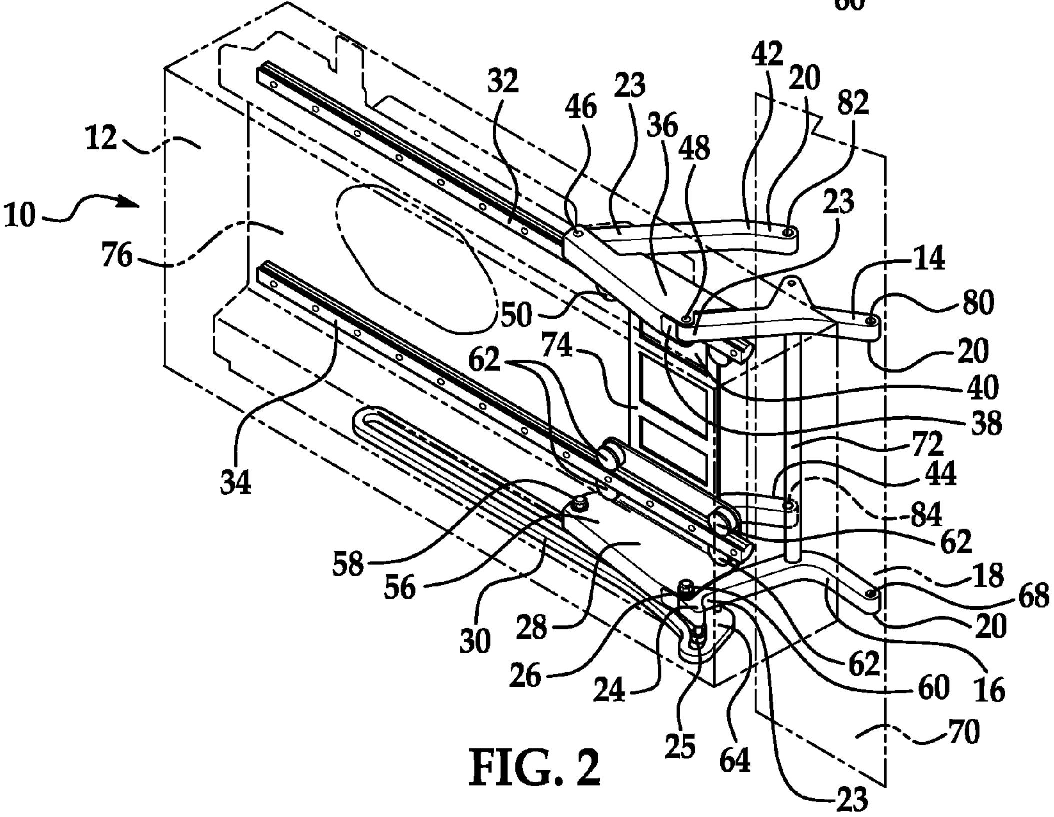
FIG. 2 is an isometric view of the first embodiment of the controlled simultaneous articulating and sliding door system (vehicle door and vehicle body shown in phantom) when the door in its initial opening state.
Figure 3:
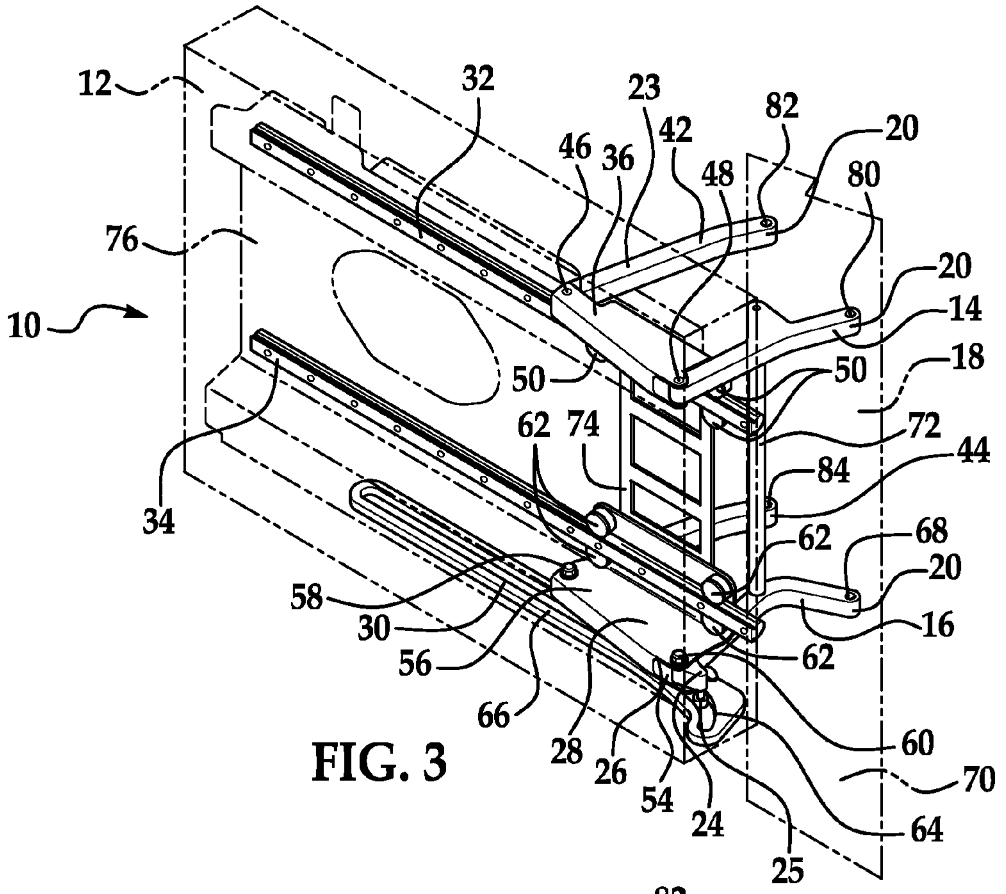
FIGS. 3 and 4 are isometric views of the first embodiment of the controlled simultaneous articulating and sliding door system (vehicle door and vehicle body shown in phantom) when the door is in its progressively opening states.
Figure 4:
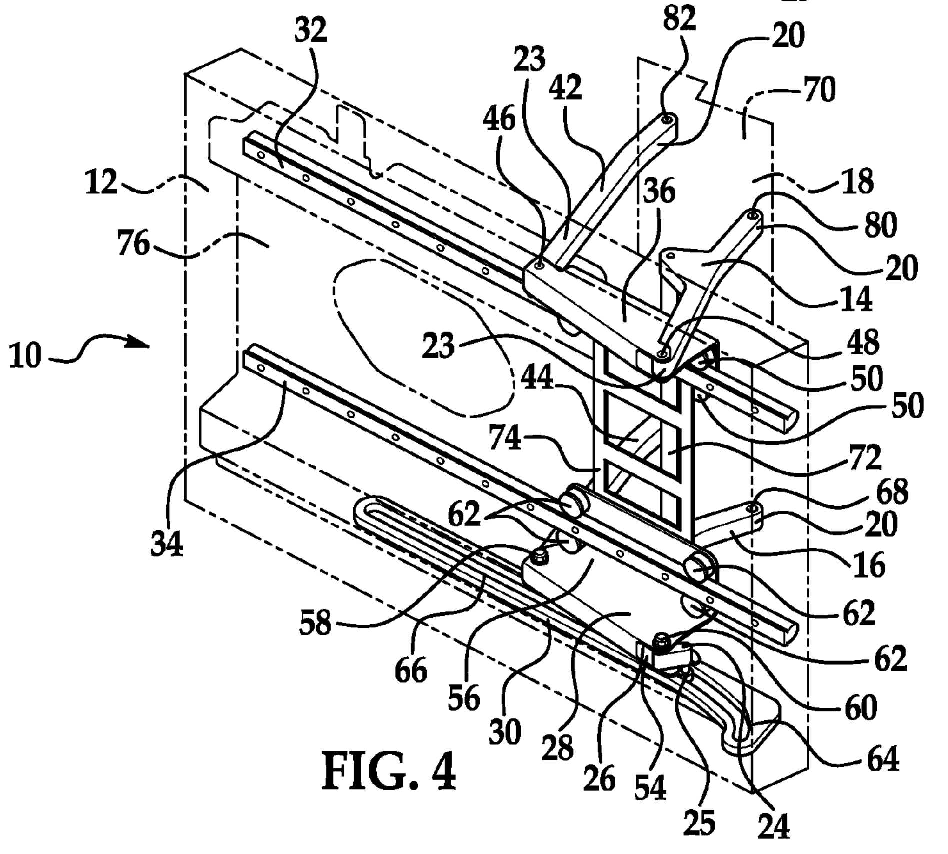
Figure 5:
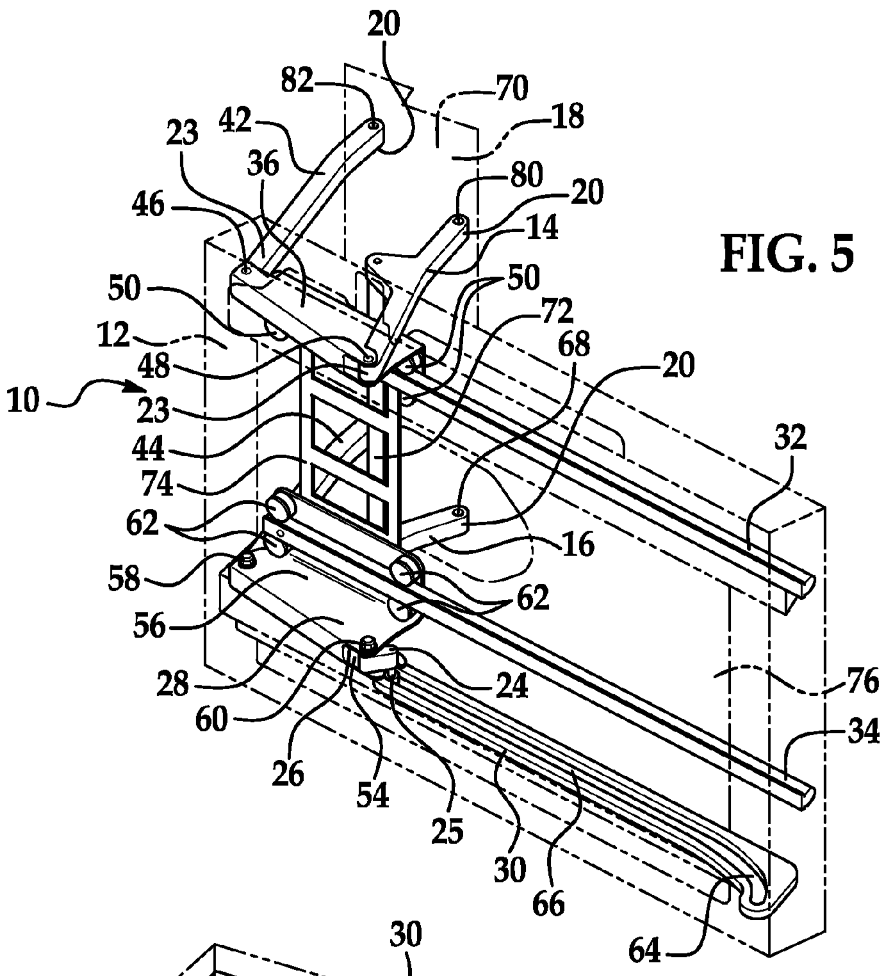
FIG. 5 is an isometric view of a first embodiment of the controlled simultaneous articulating and sliding door system (vehicle door and vehicle body shown in phantom) when the door in its fully open state.
Figure 6:
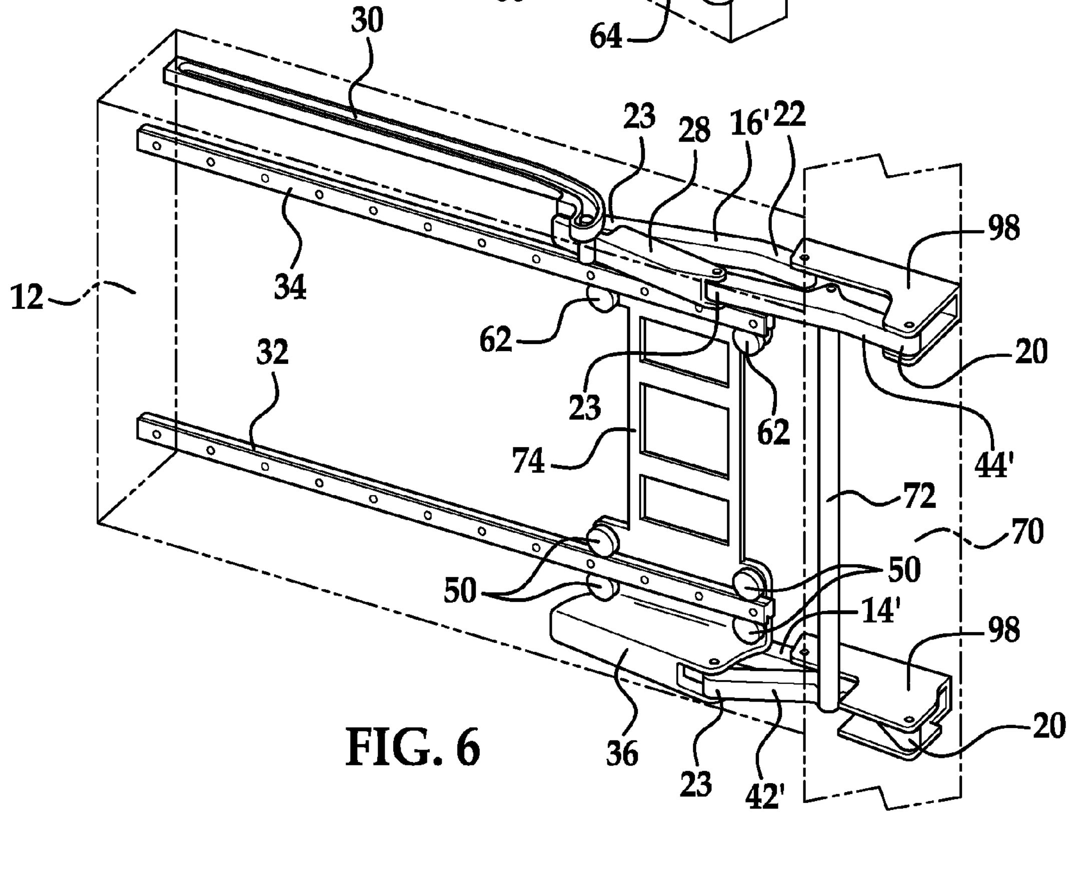
FIG. 6 is an isometric view of a second embodiment of a simultaneous articulating and sliding door system (vehicle door and vehicle body shown in phantom) when the door is in the closed position.
Figure 7:
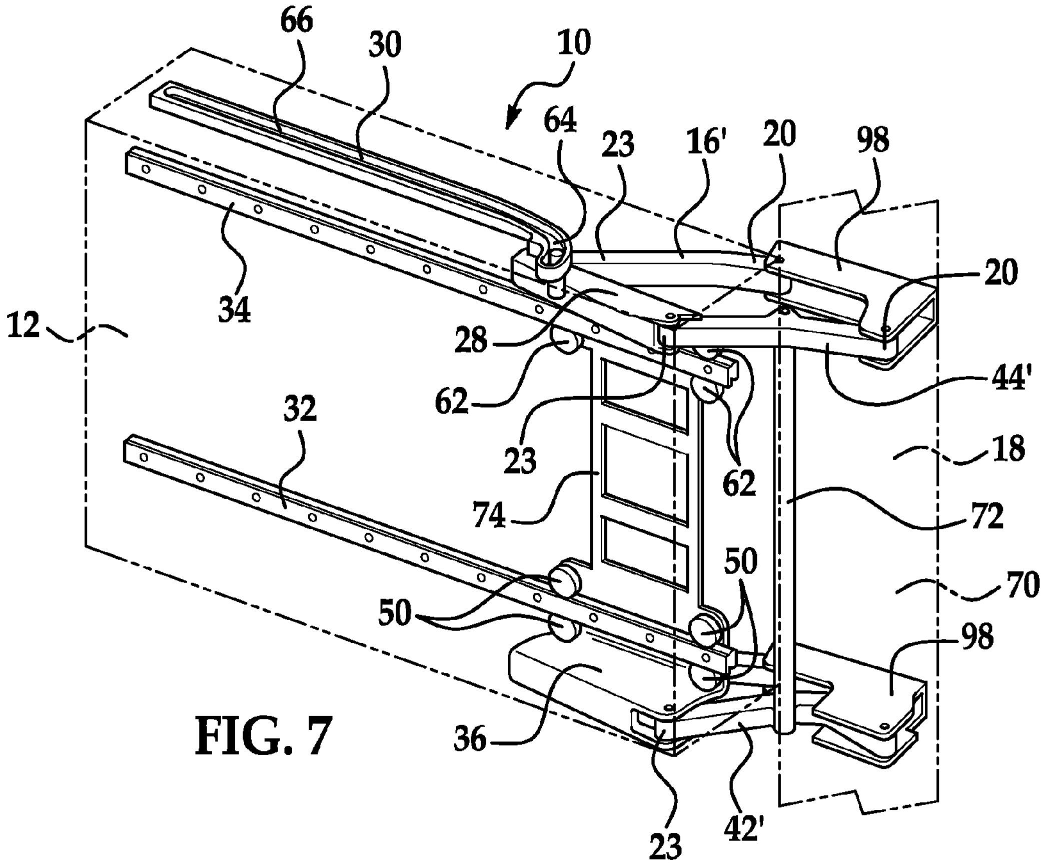
FIG. 7 is an isometric view of the second embodiment of the controlled simultaneous articulating and sliding door system (vehicle door and vehicle body shown in phantom) when the door in its initial opening state.
Figure 8:
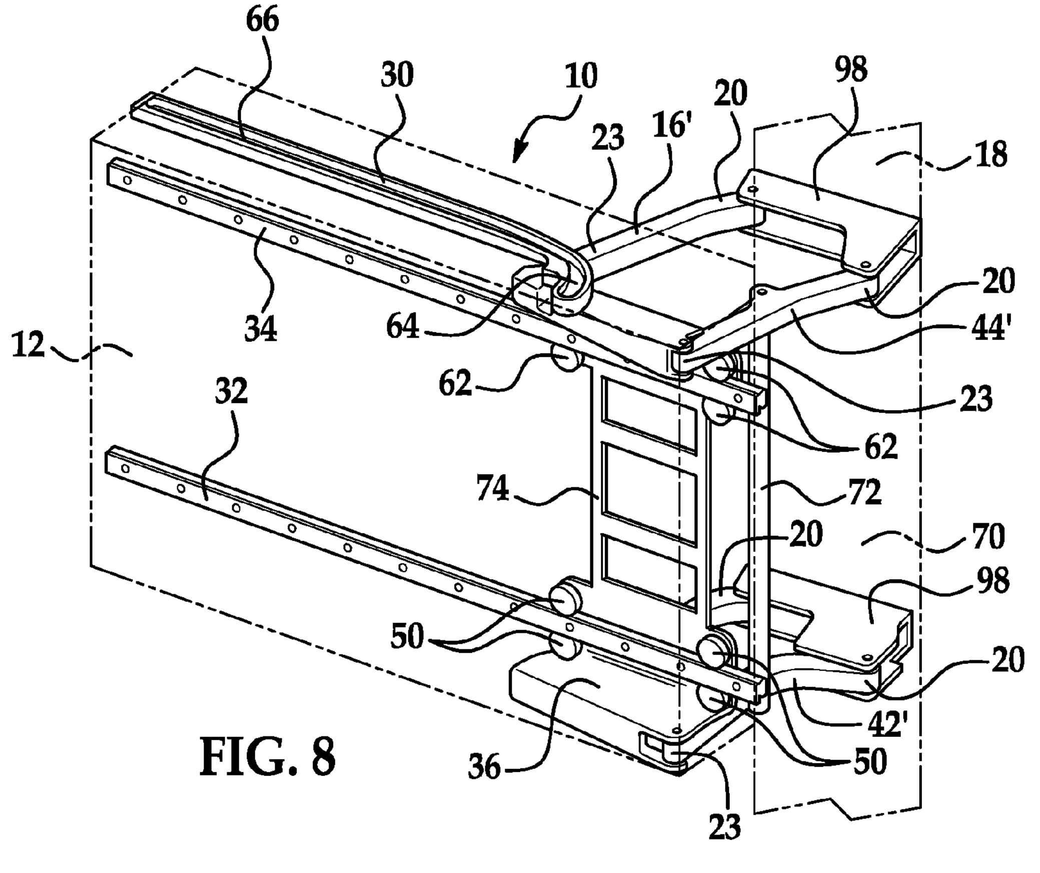
FIGS. 8 and 9 are isometric views of the second embodiment of the controlled simultaneous articulating and sliding door system (vehicle door and vehicle body shown in phantom) when the door in its progressively opening states.
Figure 9:
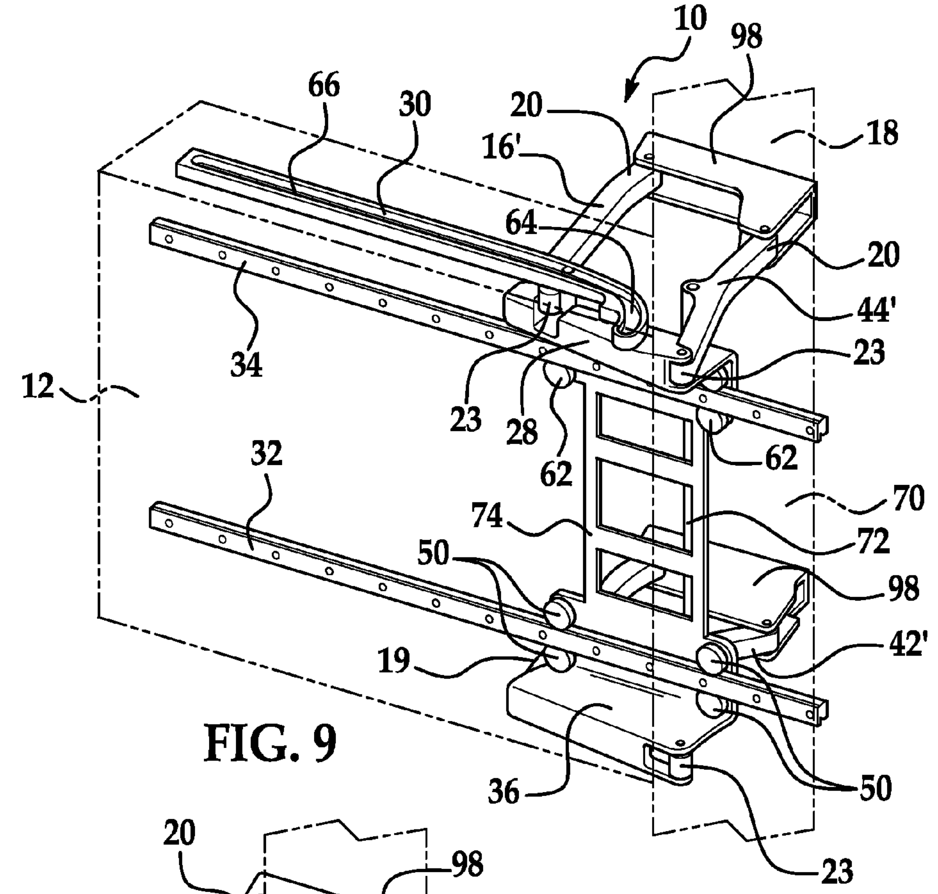
Figure 10:
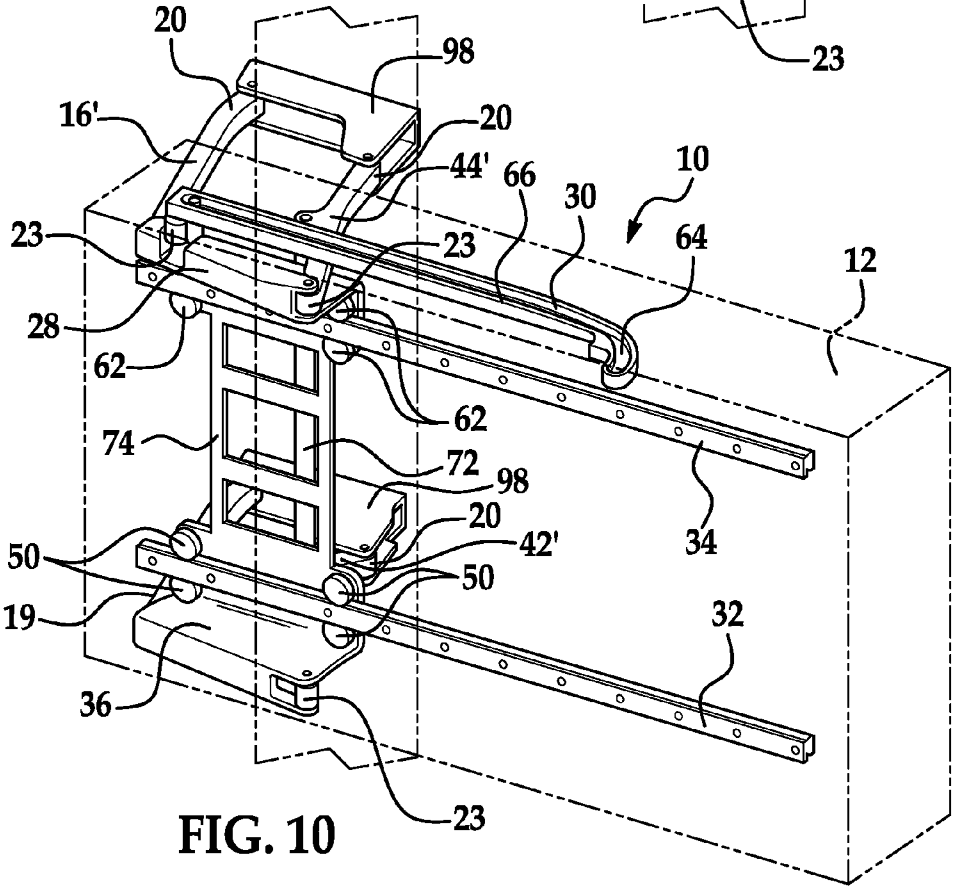
FIG. 10 is an isometric view of the second embodiment of the controlled simultaneous articulating and sliding door system (vehicle door and vehicle body shown in phantom) when the door in its fully open state.

Referring again to the drawings wherein like reference numerals are used to identify identical components in the various views, FIG. 1 illustrates the simultaneous movement system 10 for a vehicle door 12 shown in the closed position. The simultaneous movement system 10 includes a first primary hinge arm 16, a second primary hinge arm 44, a first secondary hinge arm 14 and a second secondary hinge arm 42. The first primary hinge arm 16 and the first secondary hinge arm 14 may be affixed to a tie bar 72 to ensure that the first primary hinge arm 16 and the first secondary hinge arm 14 move simultaneously.

The first primary hinge arm 16 includes a guide track region 24 and a rail region 26. (shown in FIG. 11). As shown in FIGS. 1-5, the guide track 30 is operatively configured to receive the guide track region 24 of the first primary hinge arm 16 while the rail region 26 of the first primary hinge arm 16 travels along the primary rail 34 via the primary slide 28. The cooperation of these elements allows the first primary hinge arm 16 to travel along both the guide track 30 and the primary rail 34 simultaneously through the guide track region 24 and the rail region 26 of the first primary hinge arm 16.

It is to be understood that the aforementioned terms "region (s)" and "point(s)" are being used alternatively in that both terms (points and regions) are to be understood to be small, discrete areas on a member intended for a particular use.

Similar to the first primary hinge arm 16, the first secondary hinge arm 14 the second primary hinge arm 44, and the second secondary hinge arm 42 each includes a door end 23 and a body end 20. The first primary hinge arm 16, the first secondary hinge arm 14 the second primary hinge arm 44, and the second secondary hinge arm 42 are each pivotally mounted to a vehicle body structure 70 (such as a C-pillar) at the body ends 20 thereof and are pivotally mounted to either the primary slide 28 or the secondary slide 36 as shown at the door end 23 of each hinge arm.

The first primary hinge arm 16, the first secondary hinge arm 14, the second primary hinge arm 44, and the second secondary hinge arm 42 may be mounted to the vehicle body structure 70 through the use of a mounting bracket 98 (shown in FIGS. 7-10).

The first secondary hinge arm 14 is pivotally mounted to vehicle body structure 70 or C-pillar 18 at pivot joint 80. The second secondary hinge arm 42 is pivotally attached to vehicle body structure 70 or C-pillar 18 at pivot joint 82. The first secondary hinge arm 14 is pivotally attached to the secondary slide 36 at pivot joint 48. The second secondary hinge arm 42 is pivotally attached to the secondary slide 36 at pivot joint 46.

It is to be understood that the arrangement of FIGS. 1-5 is one non-limiting example of the present disclosure. Therefore, it is also to be understood that the primary rail 34 may be disposed above, adjacent to, below or proximate to the secondary rail 32.

An example of a secondary slide 36 and a primary slide 28 is shown in FIGS. 1-10. The secondary slide 36 may include two grooves or recesses 38, 40. With respect to the secondary slide 36, first recess 38 of secondary slide 36 receives first secondary hinge arm 14 and second secondary hinge arm 42. The first secondary hinge arm 14 and the second secondary hinge arm 42 attach to the secondary slide through pivot joints 46, 48. The first secondary hinge arm 14 and second secondary hinge arm 42 attach to the secondary slide 36 via the first recess 38 of secondary slide 36. A second recess 40 of the secondary slide 36 may partially surround the secondary rail 32. Secondary slide 36 may further include rollers 50 as shown in FIGS. 1-5, bearings (not shown) or other like sliding or rolling components so that secondary slide 36 may be operatively configured to receive and slide along or translate along secondary rail 32.

With respect to the primary slide 28, first recess 54 of primary slide 28 receives first primary hinge arm 16 and second primary hinge arm 44. The first primary hinge arm 16 and the second primary hinge arm 44 attach to the primary slide 28 through pivot joints 58, 60. The first primary hinge arm 16 and second secondary hinge arm 44 attach to the primary slide 28 via the first recess 54 of primary slide 28. A second recess 56 of the primary slide 28 may partially surround the primary rail 34. Primary slide 28 may further include rollers 62 as shown in FIGS. 1-5, bearings (not shown) or other like sliding or rolling components so that primary slide 28 may be operatively configured to receive and slide along or translate along primary rail 34.

The first primary hinge arm 16 and the second primary hinge arm 44 cooperate with a primary rail 34 which is mounted to an inner panel 76 of a vehicle door 12 and operatively configured to receive a primary slide 28. As indicated, the primary slide 28 is pivotally attached to the door end of the second primary hinge arm 44. With respect to the first primary hinge arm 16, the primary slide 28 is pivotally attached to the rail region 26 of the first primary hinge arm 16. In addition to the primary rail 34, a secondary rail 32 is mounted to the vehicle door 12 to provide stability to large vehicle door systems. The secondary rail 32 is operatively configured to receive a second slide 36. The second slide 36 is pivotally mounted on a door end 23 of the first secondary hinge arm 14 and a door end 23 of the second secondary hinge arm 42 as shown in FIGS. 1-5.

It is to be understood that the arrangement shown in FIGS. 1-5 is merely one non-limiting example. Therefore, the first and second primary hinge arms 16, 44 (operating as a four bar link) may be alternatively be disposed above, below, adjacent, or proximate to the first and second secondary hinge arms 14, 42 (also operating as a four bar link). Moreover, it is to be understood that the first primary hinge arm and the first secondary hinge arm 16, 14 may also alternatively be disposed fore or aft of the second primary hinge arm 44 and the second secondary hinge arms 42.

A guide track 30 is also provided in order to facilitate continuous smooth movement of the door 12 between the open and closed door 12 positions. As shown in FIGS. 1-5, the guide track 30 is operatively configured to receive the guide track region 24 of the first primary hinge arm 16 while the rail region 26 of the first primary hinge arm 16 travels along the primary rail 34 via the primary slide 28. The cooperation of these elements allows the first primary hinge arm 16 to travel along both the guide track 30 and the primary rail 34 simultaneously through the guide track region 24 and the rail region 26 of the first primary hinge arm 16.

Figure 11:
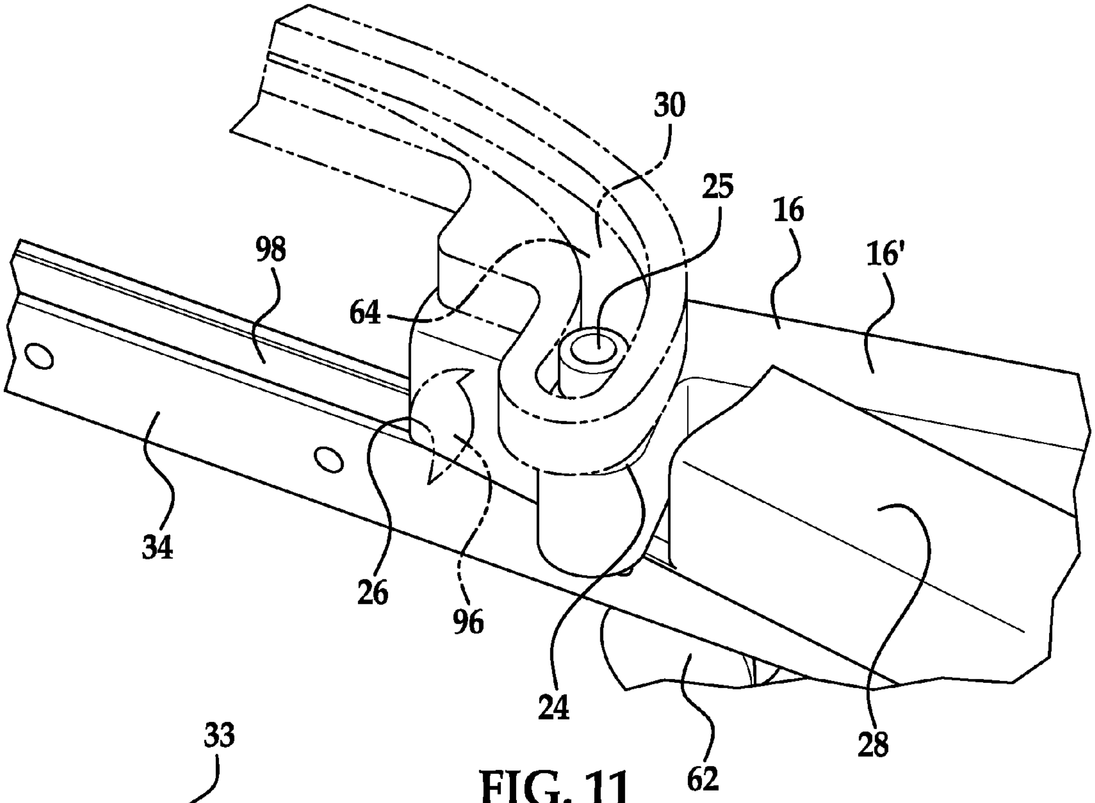
FIG. 11 is an isometric enlarged detail view of the second embodiment.
Figure 12:
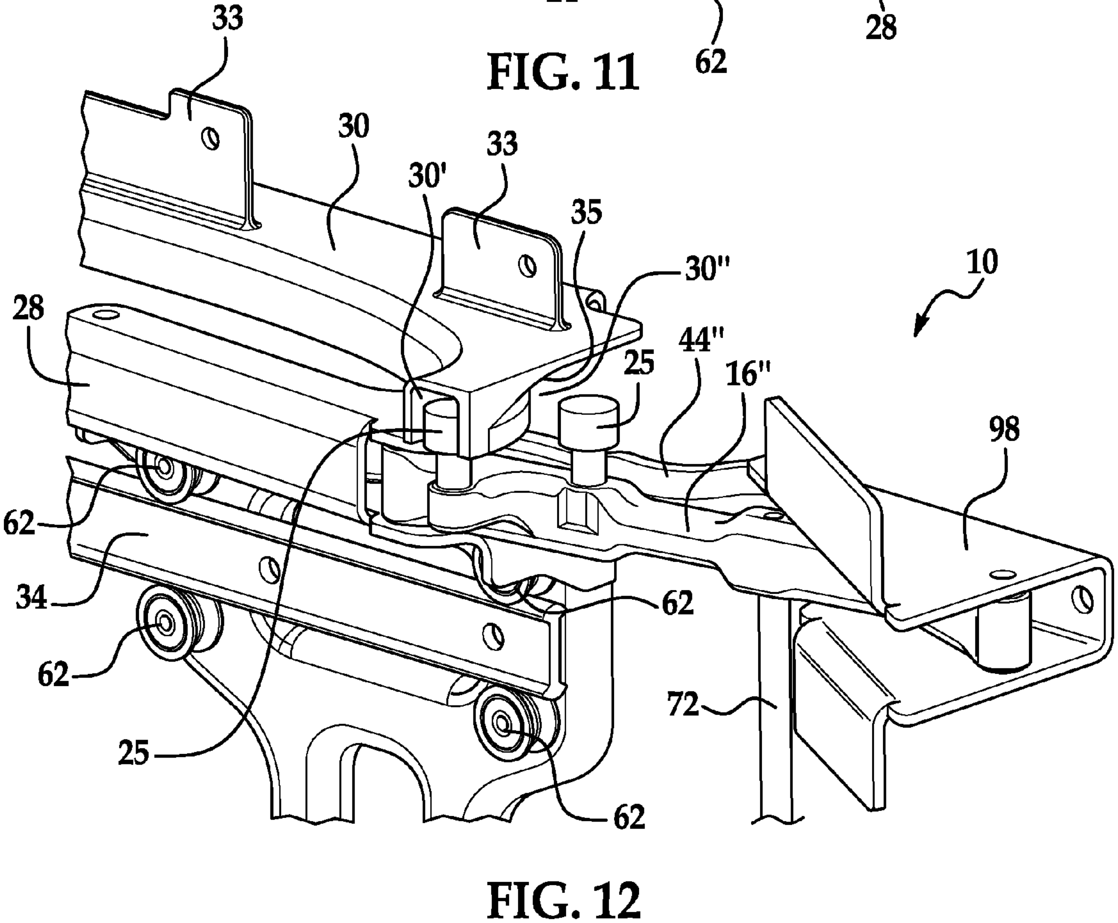
FIG. 12 is a partial, enlarged isometric view of a third embodiment of the present disclosure when the door is in a closed position.

The guide track region 24 of the first primary hinge arm 16 may further include a projection 25 consisting of at least one roller, a tab or the like which is operatively configured to move along the guide track 30 (shown in FIG. 11). The projection 25 may be integral to the first primary hinge arm 16 or it may be affixed to the first primary hinge arm 16. It is also to be understood that in one non-limiting example, the primary rail 34 and the secondary rail 32 may each be an extruded member. The primary rail 34 and the secondary rail 32 may include bearings or the like (not shown) to facilitate the movement of the primary slide 28 and the secondary slide 36 respectively. It is also to be understood that the primary rail 34 and the secondary rail 32 may each be a roll formed member.

The guide track 30 may be affixed to the door inner panel 76 or the guide track 30 may be affixed to the door hardware system (latches and/or handle systems not shown). Guide track 30 may also be integral with the primary rail 34 as shown in FIGS. 1-5. As shown in FIGS. 1-5 and FIGS. 12-16, guide track 30 may extend beyond primary rail 34 and secondary rail 32 in a longitudinal direction proximate to the aft area of the vehicle door 12 to facilitate continuous movement of the door 12.

Referring now to FIGS. 1-10, 12-16 together, guide track 30 includes a substantially curved portion 64 and a substantially linear portion 66 to allow smooth and simultaneous articulation and sliding movement of a vehicle door 12. Thus, as door 12 moves along guide track 30 which is disposed within the door 12, the door 12 is articulating (rotating relative to the vehicle) and sliding (relative to the vehicle body) at the same time. This results in smooth and continuous motion for a vehicle user.

As shown in FIGS. 1-5, the simultaneous movement system 10 of the present disclosure may further include a tie bar 72 which is operatively configured to rigidly connect the first primary hinge arm 16 to the first secondary hinge arm 14. The tie bar allows the first primary hinge arm 16 and the first secondary hinge arm 14 to articulate together. A connection member 74, shown as a non-limiting example as a plate in FIGS. 1-5, may also be affixed to the primary and secondary slides 28, 36 to permit the primary slide 28 and the secondary slide 36 to move along the primary and secondary tracks 34, 32 simultaneously.

Referring back to FIG. 11, as indicated, the guide track region 24 of the first primary hinge arm 16 may include a projection 25 such as a pin, tab and/or roller, which is operatively configured to slide and pivot within the guide track 30.

Referring now to a second embodiment shown in FIGS. 6-10, the first upper hinge arm 16' drives the movement of the door system. As shown, the simultaneous movement system for a vehicle door 12 includes: a first lower hinge arm 14', a second lower hinge arm 42', a first upper hinge arm 16' and a second upper hinge arm 16' The first upper hinge arm 16' includes a door end 23 and a body end 20. The second lower hinge arm 42' is pivotally mounted to a vehicle body structure 70 at the body end 20 thereof. The first upper hinge arm 16' pivotally mounted to a vehicle body structure 70 at a body end 20 thereof. The first upper hinge arm 16' may be operatively configured to include a guide track region 24 and a rail region 26 shown in FIG. 11. The first upper hinge arm 16' and the first lower hinge arm 14' may be affixed to a tie bar 72 to facilitate simultaneous movement between the first upper hinge arm 16' and the first lower hinge arm 14'. The second upper hinge arm 44' may be pivotally mounted to a vehicle body structure 70 at a body end 20 thereof. The second upper hinge arm 44' may be pivotally mounted on the upper slide 28 at a door end 23 thereof. The second lower hinge arm 42' includes a door end 23 and a body end 20. The second lower hinge arm 42' may be pivotally mounted to a vehicle body structure 70 at the body end 20 thereof. The upper rail 34 may be mounted to a vehicle door inner panel 76 or to the vehicle door hardware structures (such as the latch and/or door handle systems).

The upper rail 34 may be operatively configured to receive an upper slide 28. The upper slide 28 being pivotally mounted on the door end of the second upper hinge arm 44' and the rail region 26 of the first upper hinge arm 16'. A lower rail 32 may be mounted to the vehicle door inner panel 76 and/or vehicle door hardware structures (such as door latch and/or door handle) and operatively configured to receive a lower slide 36, the lower slide 36 being pivotally mounted on a door end 23 (shown in FIGS. 9 and 10) of the first lower hinge arm 14' and a door end 23 of the second lower hinge arm 42'; and a guide track 30 operatively configured to receive the guide track region 24 of the first upper hinge arm 16' thereby allowing the first upper hinge arm 16' to travel along both the guide track 30 and the upper rail 34 simultaneously through the guide track region 24 and the rail region 26 of the first upper hinge arm 16'.

The guide track region 24 of the first upper hinge arm 16' may further include a projection 25 consisting of at least one roller operatively configured to move along the guide track 30. It is also to be understood that in one non-limiting example, the primary rail 34 and the secondary rail 32 may each be an extruded member. It is also to be understood that the primary rail (34 in FIGS. 1-5), upper rail (34 in FIGS. 6-10), the secondary rail (32 in FIGS. 6-10), and the lower rail (32 in FIGS. 6-10) may each be a roll formed member.

The guide track 30 may affixed to the door inner panel 76 or the guide track 30 may be affixed to the door hardware system (latches and/or handle systems not shown). As shown in FIGS. 6-10, the simultaneous movement system 10 of the present disclosure may further include a tie bar 72 which is operatively configured to rigidly connect the second upper hinge arm 16' to the second lower hinge arm 42'. The tie bar 72 allows the second upper hinge arm 44' and the second lower hinge arm 42' to articulate together. A connection member 74 may also be affixed to the upper and lower slides 28, 36 to permit the upper slide 28 and the lower slide 36 to move along the upper and lower rails 34, 32 simultaneously.

Lower slide 36 may further include rollers 50 as shown in FIGS. 6-10, bearings (not shown) or other like sliding or rolling components so that lower slide 36 may be operatively configured to receive and slide along or translate along lower rail 32. Upper slide 28 may further include rollers 62 as shown in FIGS. 6-10, bearings (not shown) or other like sliding or rolling components so that upper slide 28 may be operatively configured to receive and slide along or translate along upper rail 34.

Referring now FIG. 11 which illustrates the guide track region 24 of the first upper hinge arm 16'. As shown, the guide track region 24 may be affixed to a projection 25 which is operatively configured to slide and pivot within the guide track 30.

Referring now to FIGS. 12-17 together, a third embodiment of the present disclosure is illustrated wherein the first primary hinge arm 16" includes two projections. As shown, the projections may be rollers 25 or tabs (not shown). The guide track 30 of the third embodiment further includes a primary guide track 30' and a secondary guide track 30". The primary guide track 30' includes a substantially curved portion 64 and a substantially linear portion 66 to allow smooth and simultaneous articulation and sliding movement of a vehicle door 12. Thus, as door 12 moves along guide track 30 which is disposed within the door, the door (not shown) is articulating (rotating relative to the vehicle) and sliding (relative to the vehicle body) at the same time. The secondary guide track 30" further assists in stabilizing the first primary hinge arm 16" as it travels along both the guide track 30 and the primary rail 34. This results in smooth and continuous motion for a vehicle user.

Figure 13:
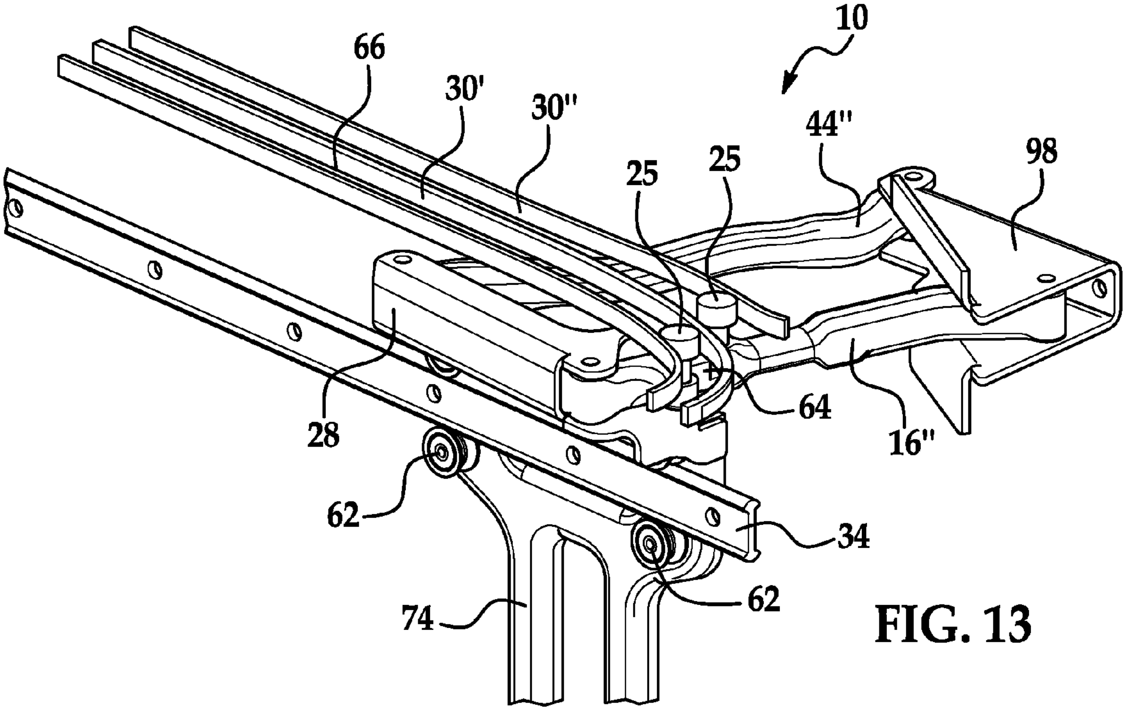
FIG. 13 is a partial, enlarged isometric view of a third embodiment of the present disclosure when the door is in an initial opening position (and the upper surface of the guide track is removed).
Figure 14:
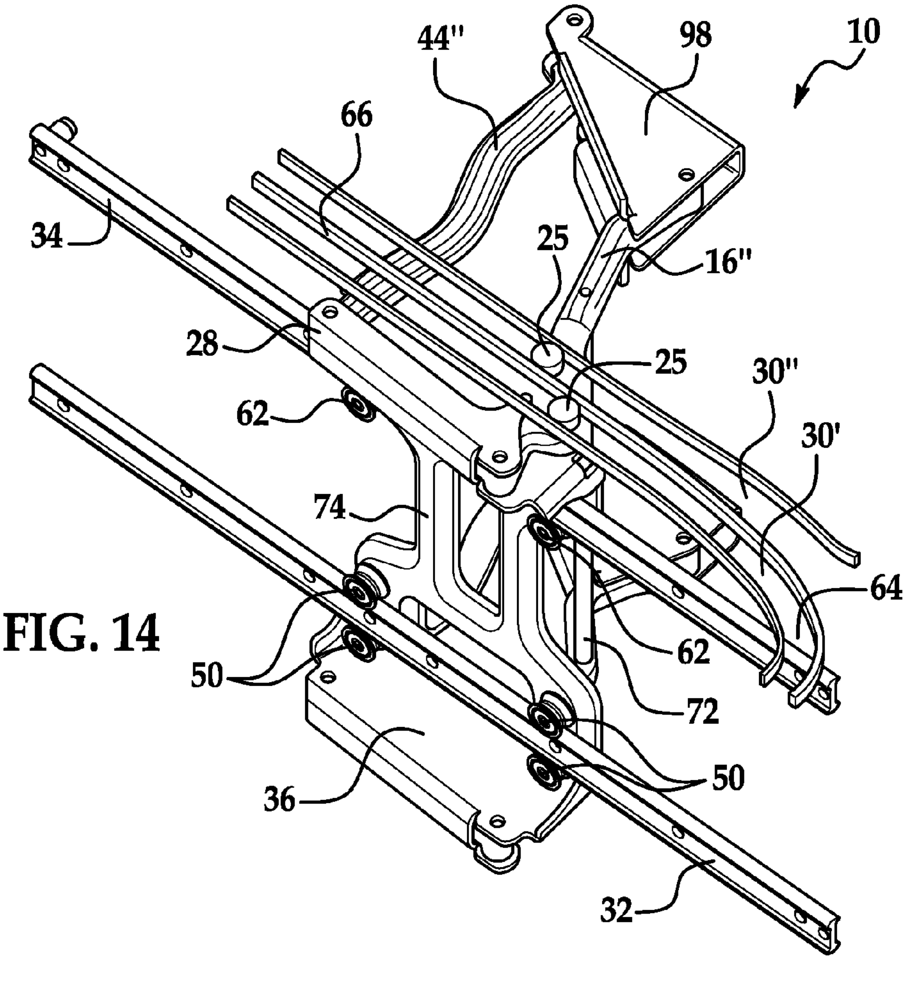
FIG. 14 is a top view of a third embodiment of the present disclosure when the door is in a first partially open position (and the upper surface of the guide track is removed).
Figure 15:
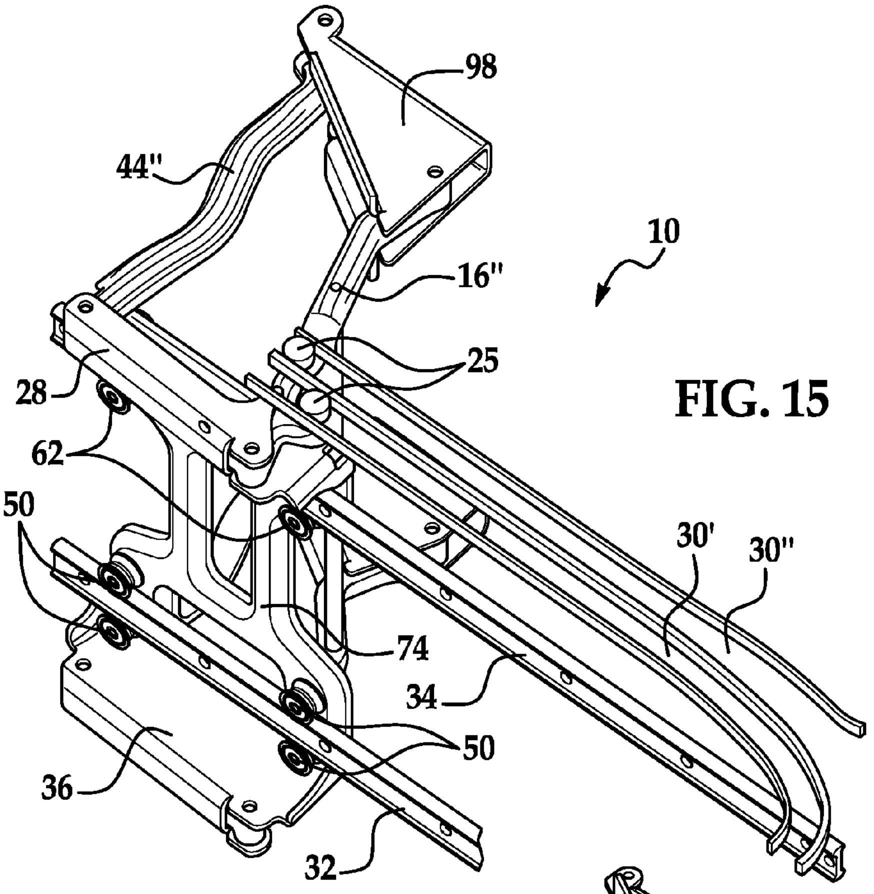
FIG. 15. is a top view of a third embodiment of the present disclosure when the door is in a fully open position (and the upper surface of the guide track is removed).

Referring now to FIGS. 13-15, the guide track 30 is shown with cover portion or cover 31 removed thereby showing the primary guide track 30' and the secondary guide track 30". The secondary guide track 30" includes a substantially linear portion 66 similar to the primary guide track 30'. However, the secondary guide track 30" has an open end 35 (shown in FIG. 12) which allows the guide track 30 to receive the second projection or second roller 25 upon opening and closing of the vehicle door (not shown).

Figure 16:
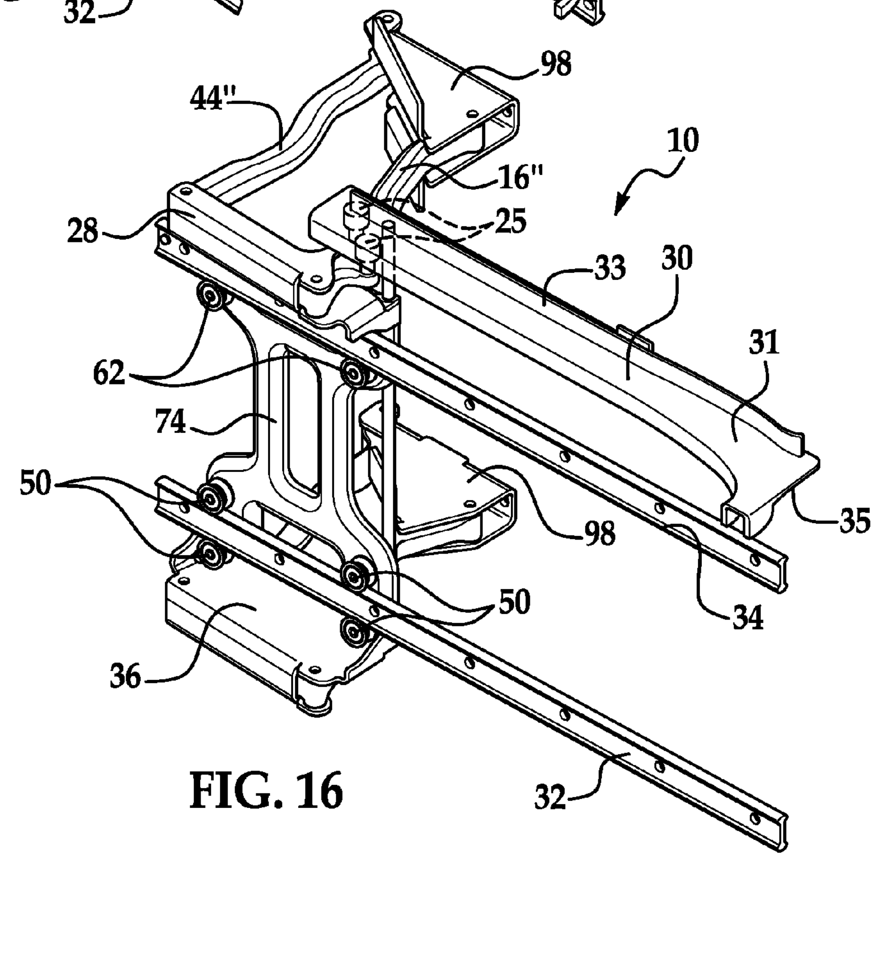
FIG. 16 is a top view of a third embodiment of the present disclosure when the door is in a fully open position (and the guide track is shown in phantom).
Figure 17:
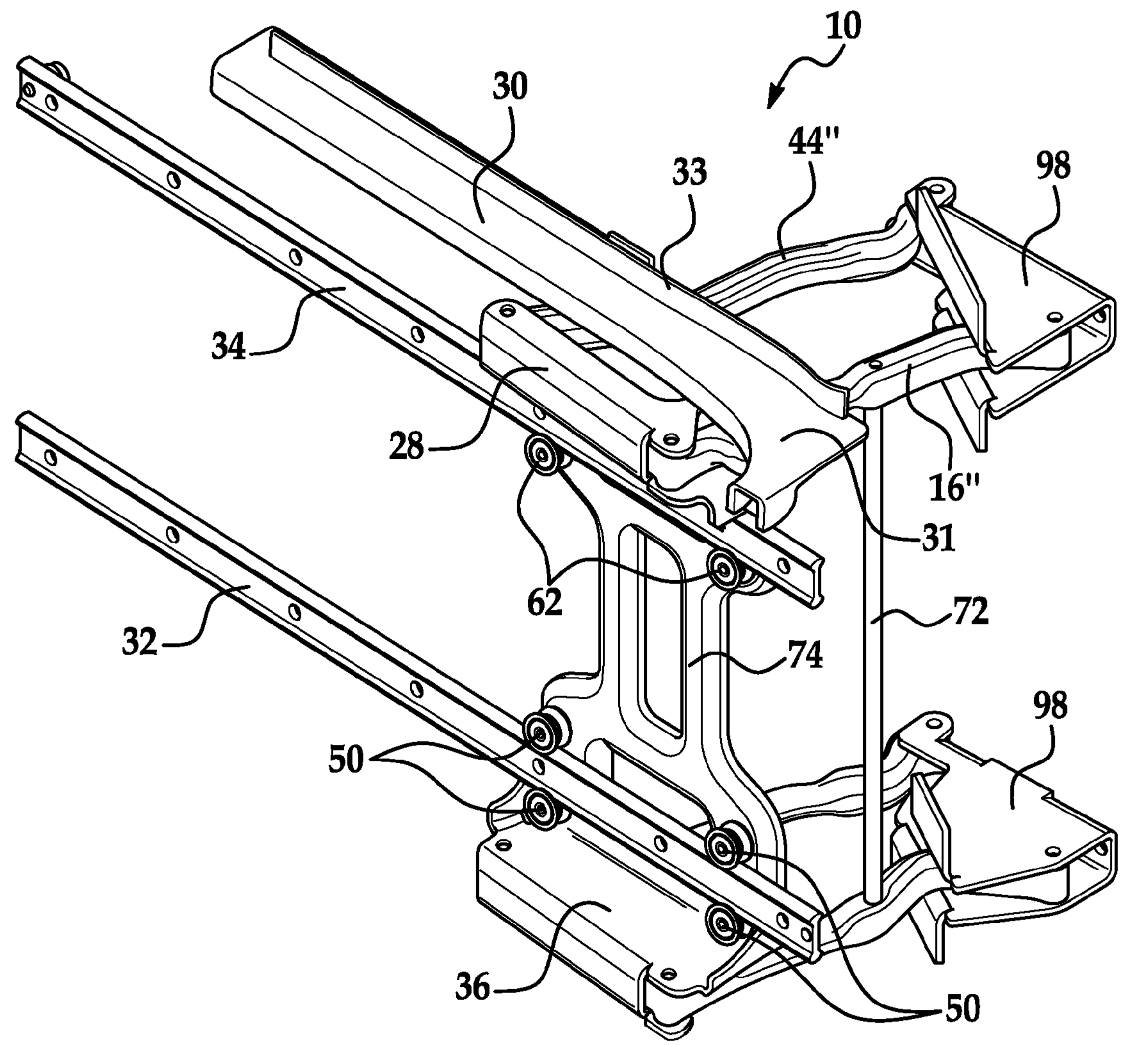

With reference to FIGS. 16-17, the guide track 30 is shown with the cover 31. The cover 31 may have an upturned edge 33 which allows the movement system 10 to be attached to a structure (not shown) within the door such as, but not limited to, a door inner (not shown). The guide track 30 may be attached to a door structure (not shown) using mechanical fasteners, welding, or the like.

While multiple embodiments have been described in detail, it will be apparent to those skilled in the art that the disclosed embodiments may be modified. Therefore, the foregoing description is to be considered exemplary rather than limiting.

What is claimed is:

1. A simultaneous movement system for a pick-up truck door, the simultaneous movement system comprising:

a first secondary hinge arm having a door end and a body end, the first secondary hinge arm being pivotally mounted to a vehicle body structure at the body end thereof;

a first primary hinge arm pivotally mounted to the vehicle body structure at a body end thereof, the first primary hinge arm operatively configured to include a guide track region and a rail region, the first primary hinge arm and the first secondary hinge arm being affixed to a tie bar;

a second primary hinge arm pivotally mounted to the vehicle body structure at a body end thereof, the second primary hinge arm pivotally mounted on a primary slide at a door end thereof;

a second secondary hinge arm having a door end and a body end, the second secondary hinge arm being pivotally mounted to the vehicle body structure at the body end thereof;

a primary rail mounted to the pick-up truck door and operatively configured to receive the primary slide, the primary slide being pivotally mounted on the door end of the second primary hinge arm and the rail region of the first primary hinge arm;

a secondary rail mounted to the pick-up truck door and operatively configured to receive a secondary slide, the secondary slide being pivotally mounted on a door end of the first secondary hinge arm and a door end of the second secondary hinge arm; and a guide track operatively configured to receive the guide track region of the first primary hinge arm thereby allowing the first primary hinge arm to travel along both the guide track and the primary rail simultaneously through the guide track region and the rail region of the first primary hinge arm.

2. The simultaneous movement system as defined in claim 1 wherein the guide track region of the first primary hinge arm includes at least one roller operatively configured to move along the guide track.

3. The simultaneous movement system as defined in claim 1 wherein the primary rail and the secondary rail are each an extruded member.

4. The simultaneous movement system as defined in claim 1 wherein the primary rail and the secondary rail are each a roll formed member.

5. The simultaneous movement system as defined in claim 1 wherein the guide track is affixed to a door inner.

6. The simultaneous movement system as defined in claim 1 wherein the tie bar is operatively configured to rigidly connect the first primary hinge arm to the first secondary hinge arm.

7. The simultaneous movement system as defined in claim 1, further comprising a connection member affixed to the primary and secondary slides.

8. The simultaneous movement system as defined in claim 1 wherein the guide track region is affixed to a projection which is operatively configured to slide and pivot within the guide track.

9. A simultaneous movement system for a vehicle door, the simultaneous movement system comprising:

a first lower hinge arm having a door end and a body end, the first lower hinge arm being pivotally mounted to a vehicle body structure at the body end thereof;

a first upper hinge arm pivotally mounted to the vehicle body structure at a body end thereof, the first upper hinge arm operatively configured to include a guide track region and a rail region, the first upper hinge arm and the first lower hinge arm being affixed to a tie bar;

a second upper hinge arm pivotally mounted to the vehicle body structure at a body end thereof, the second upper hinge arm pivotally mounted on an upper slide at a door end thereof;

a second lower hinge arm having a door end and a body end, the second lower hinge arm being pivotally mounted to the vehicle body structure at the body end thereof;

an upper rail mounted to a vehicle door and operatively configured to receive the upper slide, the upper slide being pivotally mounted on the door end of the second upper hinge arm and the rail region of the first upper hinge arm;

a lower rail mounted to the vehicle door and operatively configured to receive a lower slide, the lower slide being pivotally mounted on a door end of the first lower hinge arm and a door end of the second lower hinge arm; and a guide track operatively configured to receive the guide track region of the first upper hinge arm thereby allowing the first upper hinge arm to travel along both the guide track and the upper rail simultaneously through the guide track region and the rail region of the first upper hinge arm.

10. The simultaneous movement system as defined in claim 9 wherein the guide track region of the first upper hinge arm includes at least one roller operatively configured to move along the guide track.

11. The simultaneous movement system as defined in claim 9 wherein the upper rail and the lower rail are each an extruded member.

12. The simultaneous movement system as defined in claim 9 wherein the upper rail and the lower rail are each a roll formed member.

13. The simultaneous movement system as defined in claim 9 wherein the guide track is affixed to a door inner.

14. The simultaneous movement system as defined in claim 9 wherein the tie bar is operatively configured to rigidly connect the second upper hinge arm to the second lower hinge arm.

15. The simultaneous movement system as defined in claim 9, further comprising a connection member affixed to the upper and lower slides.

16. The simultaneous movement system as defined in claim 9 wherein the guide track region is affixed to a projection which is operatively configured to slide and pivot within the guide track.

17. A simultaneous movement system for a vehicle door, the simultaneous movement system comprising:

a first secondary hinge arm having a door end and a body end, the first secondary hinge arm being pivotally mounted to a vehicle body structure at the body end thereof;

a first primary hinge arm pivotally mounted to the vehicle body structure at a body end thereof, the first primary hinge arm operatively configured to include a first guide track region, a second guide track region, and a rail region, a second primary hinge arm pivotally mounted to the vehicle body structure at a body end thereof, the second primary hinge arm pivotally mounted on a primary slide at a door end thereof;

a second secondary hinge arm having a door end and a body end, the second secondary hinge arm being pivotally mounted to the vehicle body structure at the body end thereof;

rails mounted to the vehicle door and operatively configured to receive, respectively, the primary slide and a second slide, the primary slide being pivotally mounted on the door end of the second primary hinge arm and the rail region of the first primary hinge arm; the secondary slide being pivotally mounted on a door end of the first secondary hinge arm and a door end of the second secondary hinge arm; and a guide track operatively configured to receive the first guide track region and the second guide track region of the first primary hinge arm thereby allowing the first primary hinge arm to travel along both the guide track and the primary rail simultaneously through the guide track region and the rail region of the first primary hinge arm.

18. The simultaneous movement system as defined in claim 17 wherein the guide track comprises a primary guide track and a secondary guide track, and the first primary hinge arm comprises first and second projections, wherein the first projection engages the first guide track and the second projection engages the second guide track.

19. The simultaneous movement system as defined in claim 18 wherein the first projection comprises a first roller and the second projection comprises a second roller.

20. The simultaneous movement system as defined in claim 1 wherein the guide track comprises a primary guide track and a secondary guide track, and the first primary hinge arm comprises first and second projections, wherein the first projection engages the first guide track and the second projection engages the second guide track.

21. The simultaneous movement system as defined in claim 20 wherein the first projection comprises a first roller and the second projection comprises a second roller.

22. A vehicle door movement system comprising:

first and second primary hinge arms;

first and second secondary hinge arms;

a primary rail receiving a primary slide pivotally mounted to the first and second primary hinge arms;

a secondary rail receiving a secondary slide pivotally mounted to the first and second secondary hinge arms; and a guide track configured to receive the first primary hinge arm to travel along the guide track and the primary rail simultaneously.

23. The simultaneous movement system as defined in claim 22 wherein the guide track comprises a primary guide track and a secondary guide track, and the first primary hinge arm comprises first and second projections, wherein the first projection engages the first guide track and the second projection engages the second guide track.

24. The simultaneous movement system as defined in claim 23 wherein the first projection comprises a first roller and the second projection comprises a second roller.

* * * * *